July 30, 1963 J. C. DUDDY 3,099,586
STORAGE BATTERY ELECTRODES AND METHOD OF MAKING THE SAME
Filed Sept. 19, 1960 2 Sheets-Sheet 1

*INVENTOR.*
JOSEPH C. DUDDY

July 30, 1963  J. C. DUDDY  3,099,586
STORAGE BATTERY ELECTRODES AND METHOD OF MAKING THE SAME
Filed Sept. 19, 1960  2 Sheets-Sheet 2

INVENTOR.
JOSEPH C. DUDDY

United States Patent Office 3,099,586
Patented July 30, 1963

3,099,586
STORAGE BATTERY ELECTRODES AND METHOD OF MAKING THE SAME
Joseph C. Duddy, Trevose, Pa., assignor to The Electric Storage Battery Company, a corporation of New Jersey
Filed Sept. 19, 1960, Ser. No. 56,751
10 Claims. (Cl. 136—43)

The present invention generally relates to improvements in storage battery electrodes and to methods of making the same. More specifically, the present invention is concerned with storage battery electrodes of the type in which the active material is retained in conductive retainers which prevents or retards the dislodgment of the active material from the surface of the electrode.

A general object of the present invention is to provide a new and improved storage battery electrode of the type described which is characterized by a long cycle life and ease and economy of the manufacture.

It has been found that batteries appear to lose their capacity on cycling but that their capacity is available at lower voltage levels. This apparent loss of capacity can be attributed to the development within the battery electrodes of high internal resistances. The development of high internal resistances can be partially attributed to a loss of interparticle contact in the active material, and to a loss of active material contact with the grid, or active material retaining means. Loss of active material contact can be partially attributed to the redistribution of active material under the influence of high pressures resulting from the escape of gases through the pore structure of the plate on over-charge and even more significantly, in a positive plate to the escape of gases developed in a cell upon reversal because these gases purged through the plate structure under the condition of least plate porosity. Accordingly, one of the most important considerations in the design of storage batteries for long cycle life is the tightness with which the active material is packed within the active material retaining means whether that means were a tubular sheath or a retaining pocket. In order to achieve a tight packing of the active material within the retaining means, it is general practice in electrode manufacture to fill the retaining means with active material a layer at a time alternating it with a layer of a conductive agent and tamping each layer in place. This practice is obviously time-consuming and expensive.

In my co-pending applications Serial Nos. 818,638 and 818,766, filed June 8, 1959, and assigned to the assignee of this invention, there is described a new and improved method for making electrodes. Specifically in these applications there is disclosed a method for making electrodes in which a first thermoplastic resin, soluble in a given solvent, and a second thermoplastic resin, incompatible with the first thermoplastic resin and insoluble in the given solvent, are intimately mixed under heat and pressure in an intensive mix in such as a rubber mill to produce a plasticized mass. After the plasticization and intimate mixing of the two resins, there is added to the plasticized mass the electrode material in powdered form for the particular type of electrode to be produced. After a time interval adequate for the thorough and homogeneous mixing of the powdered electrode material and the thermoplastic resins, the mixture is removed from the mill and shaped as by calendering or extruding to produce material suitable for electrode application. After the shaping of the material and such other treatment as is required to produce the electrode, the soluble resin is leached therefrom by means of a bath in a suitable solvent leaving the electrode material bound in a microporous matrix of the insoluble thermoplastic resin. As a result of the microporosity thus developed and the resiliency or cold flow properties of the permanent binder utilized, the electrodes expand during the extraction of the soluble resin. This expansion of the porous matrix can be attributed to the capillary forces exerted thereon by the leaching solvent.

It is another object of the present invention to utilize these expansive forces in the packing of a conductive active material retaining structure of a battery electrode to achieve a condition of an optimum plate porosity and in establishing a condition of intimate contact of the active material particles with each other and the retaining means.

It is still another object of the present invention to provide a new and improved means for manufacturing battery electrodes of the type in which the active material is retaining in a conductive retainer which eliminates the arduous layer filling and tamping steps heretofore required and which lends itself to continuous methods of production.

The present invention is characterized by the utilization of two intimately mixed incompatible thermoplastic resins, one of which is soluble in a solvent in which the other is insoluble as a binder for electrode active materials in the construction of the battery electrodes of the type utilizing conductive tubular or pocket type active material retaining means. The advantages of the present invention are best illustrated in connection with tubular type electrodes for which there is produced by extruding, pencils of resin bound active material, either with or without a central conducting spine. The pencils thus produced are extruded in diameters such as will fit easily into the conductive active material retaining tubes. The ends of the filled tubes are then pinched shut to form terminals which are suitable for connection to conductive top and bottom bars to form electrodes. Following the assembly of these electrodes, they are placed in a bath of leaching solvent and the soluble resin phase of the binder leached therefrom. The removal of the soluble resin phase from the extruded pencils within the active material retaining means results in capillary forces sufficiently high to distend the plastic matrix diametrically into intimate contact with the conductive retaining tubes and the conductive core where one is utilized. Optimum correlations have been formed to exist between the formulation of the active material and the resin binders, the ratio of the diameter of the extruded pencils of active materials and resin binders and the diameter of the retaining tube.

In carrying out the present invention, the combination of resins utilized must be chosen with the following criteria in mind. First, both resins must be thermoplastic and have substantially similar physical properties in the plastic state. In this respect, it is desirable that the resins have similar viscosities in the plastic state and that they become plastic within temperature ranges which overlap to an extent permitting the mixing of the resins in their plastic states without substantially degrading the resin with the lower temperature of plasticization. Secondly, the two resins must be substantially incompatible, that is, that after admixture in their thermoplastic states, they exist as separate and distinct phases in the product, the one being substantially insoluble in the other. Thirdly, one resin must be readily soluble in a solvent in which the other resin is substantially insoluble. Lastly, the resins must be capable of a high degree of loading with finely divided active material.

By way of specific example, the following are some of the resins which may be utilized as permanent binder material: polyethylene, polypropylene, polystyrene, and polyvinyl chloride. The following water soluble thermoplastic resins are extremely advantageous from the economic point of view for use as the temporary soluble thermoplastic binder: polyethylene oxide, polyethylene glycol, and polyvinyl pyrrolidone. It should be understood, however, that it is not necessary that the soluble thermoplastic resin utilized as the temporary binder and pore forming agent be water soluble. Care should be taken, however, in choosing the solvent which is to be utilized for removing the temporary resin phase since it should not be one which will react adversely with the active material or the active material retaining means. In this respect, water soluble resins are also desirable because when water is used as the solvent, no adverse reaction has been found to occur.

The use of a soluble thermoplastic resin as a pore forming agent can be readily contrasted with the use of prior art pore forming agents such as starch, salt, horsehair, and the like which contribute nothing to the strength of the electrode during manufacture and, by their presence, limit the loading of the permanent binder with electrochemically active ingredients and thus, require the presence of a higher percentage of binder in the finished electrode. The reason that these prior art pore forming agents limit the loading of the non-soluble binder with active material is due to the fact that such materials are generally of the same physical nature as the active material, that is, granular in nature, and do not themselves act as binders.

A better understanding of the present invention may be had from the following description of specific embodiments thereof when read with reference to the accompanying drawings of which:

Figure 1:
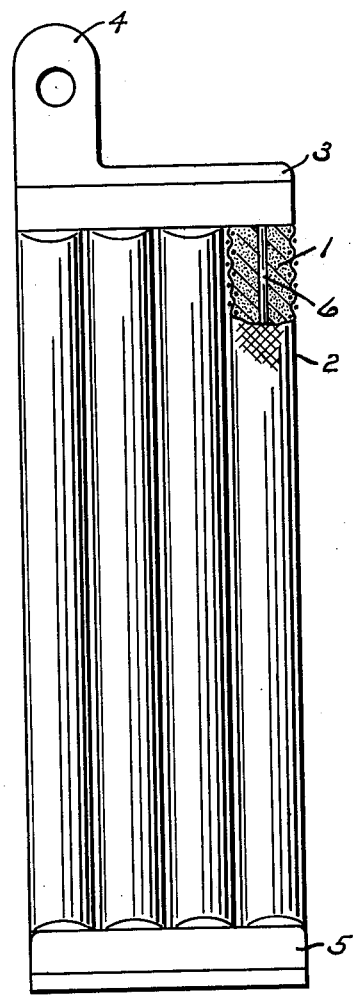
FIG. 1 is a side elevation of an embodiment of the present invention in which the active material is in the form of a plurality of spaced pencils.

Referring now to the drawings, there are illustrated several forms of a storage battery plate in accordance with the present invention. In the embodiment of FIG. 1, the active material is in the form of a plurality of spaced pencils 1 provided with conductive retaining sheaths or tubes 2. The pencils of active material 1 are secured to a top bar 3 having a lug 4 and are secured at their opposite ends to a bottom bar 5. If desired, each of the pencils of active material may be provided with a central conductive core or spine 6.

In accordance with the present invention, the conductive sheaths 2 which surround the active material pencils 1 may take a plurality of forms. By way of illustration and example, and not by way of limitation, the conductive sheaths 2 may be in the form of individual fabric tubes having a surface deposit of metal thereon to make them conductive. By way of specific example, for an alkaline battery, the sheaths 2 may comprises tubes woven, braided, or knitted of nylon, tetrafluoroethylene, polyvinyl chloride, or other synthetic resin insert to the battery electrolyte and coated with metallic nickel deposited thereon either by the electroless method or by spraying. The retaining sheaths 2 may also be braided, woven, or knitted of wire or wire and synthetic resin threads which will be resistant to the electrolyte within the battery and they may be either in the form of individual tubes or a plurality of interconnected tubes enclosing a group of pencils wherein the components threads lie around and between a plurality of pencils and provide a web portion between the individual pencils. This latter construction is the type disclosed and claimed in U.S. Patent 2,350,752, issued June 6, 1944, to E. Graf.

Figure 2:
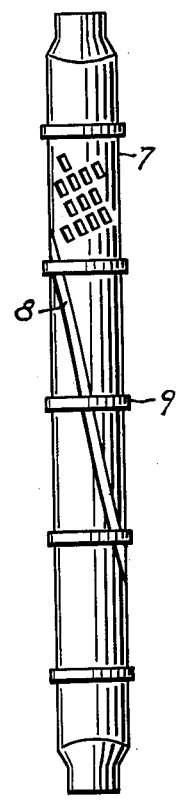
FIG. 2 is a side elevation of a modification of the retaining sheath utilized in the electrode shown in FIG. 1.
Figure 3:
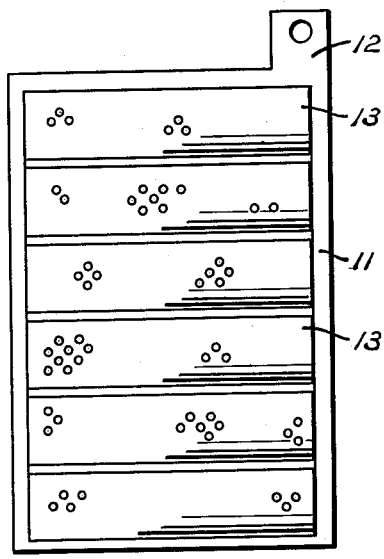
FIG. 3 is a side elevation of another embodiment of the present invention in which the active material is retained in a plurality of electrode pockets.

It is also within the scope of the present invention that the retaining sheaths 2 can take the form of a perforated tube 7 shown in FIG. 2. For an alkaline battery the tube 7 may be made of perforated nickel plated steel ribbons wound spirally with a seam 8 which is lapped and swaged flat. If desired, the tubes 7 may be surrounded with a plurality of retaining rings 9 for reenforcement. While the specific examples given hereinbefore have been restricted to electrodes comprising of spaced pencils of active material, a construction generally utilized for positive electrodes, it should be understood that the present invention is also applicable to electrodes in which the conductive retaining sheath is in another form, as, for example, in the form of a pocket type electrode as shown in FIG. 3. As shown, such an electrode comprises a conductive frame 11 having an up-standing lug 12 at one corner and a plurality of pockets 13 formed from thin perforated sheet metal supported by and with the frame. For an alkaline electrode, such sheet metal may consist of iron, iron plated with nickel, or of nickel and the pockets filled with active material such as cadmium, iron, cadmium and iron or iron and mercury. If the electrode of the present invention is to be utilized in an acid battery system, it should be understood that the conductive metal used for the sheath member of the electrode will then be fabricated from a metal such as lead, which is relatively inert in acid electrolytes.

While the form of the conductive active material retaining sheath of an electrode of the present invention may take many forms as illustrated hereinbefore, in accordance with the present invention the active material within the conductive retaining sheath comprises the electrochemically active electrode material bound in a matrix of an insoluble themoplastic resin which has been rendered microporous by having removed therefrom a soluble thermoplastic resin phase, the latter having been homogeneously dispersed throughout the mass of active material and insoluble resin. Still further in accordance with the present invention, the removal of the soluble thermoplastic resin phase is carried out after the electrode has been assembled by means of soaking the electrode in a bath of a suitable solvent for the soluble resin phase and utilizing the swelling which accompanies the leaching step to establish a condition of intimate contact of the active material particles with each other and with the active material retaining sheath. It should be understood, however, that while the explanation which follows is given in connection with a tubular type electrode utilizing nickel hydrate as its active material, that the teachings of the present invention are equally applicable to other forms of electrodes utilizing other active materials.

To produce one form of active material pencil for nickel positive electrodes in accordance with the teachings of the present invention, there is intimately mixed under heat and pressure in an intensive mixer one part by weight polyethylene, and 1.7 parts of polyethylene oxide to produce a plasticized mass. Specifically, the intimate mixing and plasticization of the two resins may be accomplished on a two roll rubber mill with the rolls operated at differential speeds and heated to a temperature of from about 220° F. to about 250° F. After the plasticization and admixing of the thermoplastic resins has been completed, there is added to the plasticized mass on the mill 12 parts by weight of finely divided green nickel hydrate and 2.8 parts by weight of powdered graphite. As will be understood by those skilled in the art, the graphite enhances the conductivity of the electrode. It is preferable that the graphite be composed of a mixture of coarse and fine graphite particles and that these be pre-mixed with the nickel hydrate as by ball-milling prior to their introduction and mixing into the plasticized resins.

After a time interval adequate for the thorough and intimate mixing of the nickel hydrate of the graphite into the resins, the plasticized mass may be removed from the mill in preparation for extruding. A time interval of from about 2 to 3 minutes has been found to be satisfactory for the plasticizing and admixing of the resins and a time on the order of about 7 minutes has been found satisfactory for the thorough mixing of the electrode material into the plasticized resins.

The material produced by the milling step described above is next shredded for feeding to an extruder. For the production of pencil shaped material for utilization in conductive sheaths having a diameter of 0.25 inch, rods are extruded having a diameter of 0.248 inch. The temperature of the extruder die and cylinders may be maintained at 220° F. for the extrusion. Where desired, the rods may be extruded around a central conductive spine which for a nickel electrode may advantageously comprise a nickel wire. For this purpose wire having a diameter of approximately 0.03 inch has been found to be suitable. Following the extrusion of the rods, they are next cut to the desired length and placed in their retaining sheaths which are then assembled and fabricated into electrodes in the conventional manner.

In accordance with the present invention, the polyethylene oxide or the soluble resin phase of the electrode system is next leached from the active material pencils in the electrode. Since polyethylene oxide is water soluble, this is accomplished by immersion of the electrodes into a water bath. Where different resins are utilized, a bath in an appropriate solvent will be utilized. As will be obvious, the rate of solventation of the polyethylene oxide from the resin-active material matrix will vary proportionally with the dimensions of the electrode configuration. For electrode pencils of the type described, a 24 hour bath in water has been found to be adequate for removal for substantially all of the polyethylene oxide. As noted hereinbefore, the extraction of the polyethylene oxide is accompanied by a swelling of the active material-permanent resin matrix which, in accordance with the present invention, is utilized in establishing a condition of optimum electrode porosity and active material contact both of which parameters control to a large degree ultimate electrode performance. The swelling which takes place can be attributed to the derivation of inerstitial interconnected voids in the matrix by virtue of the operation of capillary expansion.

By way of example of the extent to which the unrestrained pencils of the material described above will expand under these conditions, rods having a diameter of 0.247 inch reached the maximum diameter of 0.258 inch after 24 hours soaking. This represents a 4% increase in rod diameter. When the rods were allowed to dry in air, they shrunk to a size only 1% larger than their original diameter. Upon rewetting, these rods reached a final size of about 1½% larger than the original diameter. The expansion derived by the extraction of the soluble resin phase in accordance with the present invention is restrained in part by the conductive active material retainer to achieve intimate and lasting electrical contact with that member. Since the active material retainer does restrain the expansion of the active material resin matrix, care must be taken to avoid a condition where the restraint is so great as to impair the development of sufficient porosity in the matrix. In each electrode system produced in accordance with the teachings of the present invention there will exist an optimum expansion determined by the porosity developed and the electrical contact established between the active material particles in the matrix and the contact achieved with the active material retainer and the central conductive spine if any is utilized. The expansion of the active material resin matrix can be controlled by controlling the formulation of the matrix as will be explained in more detail hereinafter and by controlling the size of the insert utilized.

Figure 4:
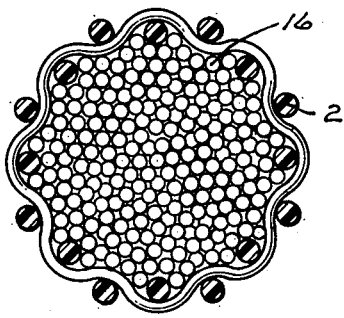
FIG. 4 is a sectional view of a modification of the active material pencils utilized in an electrode of the type shown in FIG. 1.

For the tubular type electrodes of the type shown in FIG. 1, it is not necessary that the active material pencils comprise one unit. It is also within the scope of the present invention that the active material comprise a plurality of thin pencils of active material and thermoplastic resin as shown in FIG. 4. Referring now to FIG. 4, the numeral 2 designates a conductive retaining sheath and the numeral 16 designates a plurality of thin pencils of active material and thermoplastic resin. In the production of an electrode of this type, each active material retaining tube is filled with a plurality of thin pencils of material as shown and after electrode assembly, the soluble resin phase can be leached therefrom in the manner described hereinbefore. As in the embodiment of the present invention described hereinbefore, a central conductive spine may be provided in the type of electrode shown in FIG. 4. Such a conductive spine may consist of a wire or where desirable, a tubular screen having the individual active material pencils 16 in and around it.

Where it is desired to produce active material for pocket type electrodes of such as is shown in FIG. 3, the active material and thermoplastic resin mixture as it comes from the mill can be calendered to produce sheets of the desired thickness. The sheets can then be cut to produce elements of a size adapted to fit into the pocket of such an electrode. It should also be understood other active materials may be utilized and the teachings of the present invention are applicable to other active materials and electrode configurations. For example, the present invention is applicable for the production of electrodes utilizing active materials such as lead oxides, zinc oxides, cadmium oxide, iron oxides, to mention but a few. The amount of these active material with which the plasticized thermoplastic resins utilized can be loaded depends primarily upon the size of the active material particles. As a general rule, it has been found that the amount of loading which can be achieved will increase as the size of the active material particles increase.

In electrodes produced in accordance with the present invention, porosity is in part dependent upon the ratio of the soluble thermoplastic resin binder to the insoluble thermoplastic resin binder, and to a larger degree, upon the derivation of interstitial voids by virtue of the operation of capillary expansion. It should also be understood that since the active material retaining means utilized aids in retaining the active material in the electrode, that the amount of permanent resin binder which will remain in the electrode after the removal of the soluble resin phase can be substantially less than that which would be required if no active material retaining means were employed. It has been found that optimum electrode performance is achieved in accordance with the present invention where the insoluble thermoplastic resin is present in amount varying from approximately ⅑ the amount of the insoluble resin to 3 times the amount of insoluble resin. Should the amount of the permanent or insoluble resin binder be decreased below the lower limit set by the ratio of 1 to 9 described above, a condition of maximum porosity with disruption of the binding resin phase occurs. In this state of disruption the active material particles then to dislodge themselves from the electrodes. To prevent this, there may be interposed between the conductive retaining sheet and the shaped active material mass a matted fibrous filter having pores of a size which are less than the minimum particle size of the active material mass. Where such a filter is provided the lower limit of insoluble resin binder would approach but not be less than ⅟₁₆ of the amount of the soluble resin phase. It should also be understood that in the specific electrode formulation cited hereinbefore, that the ratio of resins specified was not necessarily that which will provide optimum electrode performance for various electrode configurations.

Having described the present invention, that which is claimed is:

1. A method of producing electrodes which comprises intimately and homogeneously mixing a plasticized first thermoplastic resin, a plasticized second thermoplastic resin in a ratio based upon parts by weight of said first thermoplastic resin of between 1 to 9 and 3 to 1 and an electrochemically battery active material in powdered form to produce a plasticized mass, said second thermoplastic resin being substantially insoluble in said first thermoplastic resin, shaping said mass to produce elements substantially conforming to the active material conductive retaining means, placing said elements into said retaining means, and subjecting said electrode to a solvent in which said second thermoplastic resin is soluble and said first thermoplastic, said active material and said conductive retaining means are substantially insoluble and inert to substantially remove from said electrode said second thermoplastic resin to render said electrode porous and to swell said matrix formed by said first thermoplastic resin and said active material into intimate contact with said conductive retaining means.

2. Method as specified in claim 1 wherein said electrochemically active material is selected from the group consisting of cadmium oxide, lead oxides, zinc oxide, iron oxide and nickel hydroxide.

3. Method as specified in claim 1 wherein said first thermoplastic resin is selected from the group consisting of polyethylene, polypropylene, polystyrene, and polyvinyl chloride.

4. Method as specified in claim 1 wherein said second thermoplastic resin is selected from the group consisting of polyethylene oxide, polyethylene glycol and polyvinyl pyrrolidone.

5. An electrode for batteries according to the method of claim 1.

6. A method of producing electrodes which comprises intimately and homogeneously mixing under heat and pressure a first themoplastic resin, a second thermoplastic resin in a ratio based upon parts by weight of said first thermoplastic resin of between 1 to 9 and 3 to 1 and an electrochemically battery active material in powdered form to produce a plasticized mass, said mixing being carried out at a temperature sufficient to plasticize both resins and insufficient to substantially degrade said resins and said electrochemically active material, said second thermoplastic resin being substantially insoluble in said first thermoplastic resin, shaping said mass to produce elements substantially conforming to the active material conductive retaining means, placing said elements into said retaining means, and subjecting said electrode to a solvent in which said second thermoplastic resin is soluble and said first thermoplastic, said active material and said conductive retaining means are substantially insoluble and inert to substantially remove from said electrode said second thermoplastic resin to render said electrode porous and to swell said matrix formed by said first thermoplastic resin and said active material into intimate contact with said conductive retaining means.

7. Method as specified in claim 6 wherein said electrochemically active material is selected from the group consisting of cadmium oxide, lead oxides, zinc oxide, iron oxide and nickel hydroxide.

8. Method as specified in claim 6 wherein said first thermoplastic resin is selected from the group consisting of polyethylene, polypropylene, polystyrene, and polyvinyl chloride.

9. Method as specified in claim 6 wherein said second thermoplastic resin is selected from the group consisting of polyethylene oxide, polyethylene glycol and polyvinyl pyrrolidone.

10. An electrode for batteries according to the method of claim 6.

References Cited in the file of this patent

UNITED STATES PATENTS

| | | |
|---|---|---|
| 745,604 | Hartung | Dec. 1, 1903 |
| 2,234,732 | Haunz | Mar. 11, 1941 |
| 2,738,375 | Schlotter | Mar. 13, 1956 |
| 2,806,256 | Johannsen | Sept. 17, 1957 |
| 2,838,590 | Garine | June 10, 1958 |

FOREIGN PATENTS

| | | |
|---|---|---|
| 167,977 | Australia | July 24, 1956 |
| 461,680 | Canada | Dec. 6, 1949 |